(12) United States Patent  
Chevalier et al.

(10) Patent No.: US 10,275,110 B2  
(45) Date of Patent: *Apr. 30, 2019

(54) USER READABILITY IMPROVEMENT FOR DYNAMIC UPDATING OF SEARCH RESULTS

(71) Applicant: EMC IP Holding Company LLC, Hopkinton, MA (US)

(72) Inventors: Pierre-Yves Chevalier, Saint-Ismier (FR); Marc Brette, Domene (FR)

(73) Assignee: EMC IP Holding Company LLC, Hopkinton, MA (US)

(*) Notice: Subject to any disclaimer, the term of this patent is extended or adjusted under 35 U.S.C. 154(b) by 379 days.

This patent is subject to a terminal disclaimer.

(21) Appl. No.: 15/057,849

(22) Filed: Mar. 1, 2016

(65) Prior Publication Data

US 2016/0239553 A1    Aug. 18, 2016

Related U.S. Application Data

(63) Continuation of application No. 13/467,725, filed on May 9, 2012, now Pat. No. 9,311,421, which is a continuation of application No. 11/522,059, filed on Sep. 15, 2006, now Pat. No. 8,201,107.

(51) Int. Cl.

| | |
|---|---|
| *G06F 3/0481* | (2013.01) |
| *G06F 16/248* | (2019.01) |
| *G06F 16/958* | (2019.01) |
| *G06F 16/9535* | (2019.01) |
| *G06F 16/2457* | (2019.01) |
| *G06F 3/0482* | (2013.01) |
| *G06F 16/951* | (2019.01) |

(52) U.S. Cl.  
CPC .......... *G06F 3/0481* (2013.01); *G06F 16/248* (2019.01); *G06F 16/24578* (2019.01); *G06F 16/958* (2019.01); *G06F 16/9535* (2019.01); *G06F 3/0482* (2013.01); *G06F 3/04812* (2013.01); *G06F 16/951* (2019.01)

(58) Field of Classification Search  
CPC combination set(s) only.  
See application file for complete search history.

(56) References Cited

U.S. PATENT DOCUMENTS

| | | | |
|---|---|---|---|
| 2002/0052674 A1* | 5/2002 | Chang ................. | G06F 17/3087 700/300 |
| 2004/0103087 A1* | 5/2004 | Mukherjee ........ | G06F 17/30864 |
| 2006/0271883 A1* | 11/2006 | Bier ..................... | G06F 3/0481 715/853 |
| 2007/0044035 A1* | 2/2007 | Amadio ................ | G06F 3/0481 715/781 |

* cited by examiner

*Primary Examiner* — Tuyetlien T Tran  
(74) *Attorney, Agent, or Firm* — Van Pelt, Yi & James LLP (57) ABSTRACT

A system for moving search results visibly comprises an interface, a processor and a memory. The processor is configured to a) determine an ordering of one or more results in a subsequent set of search results as merged into a displayed set of search results; b) determine one or more interleaving positions for the subsequent set of search results in the displayed set of search results; c) cause the creation of one or more blank spaces in the one or more interleaving positions; and d) cause a display of one or more results in the subsequent set of search results in the one or more blank spaces. The memory causes a display of one or more results in the subsequent set of search results in the one or more blank spaces.

20 Claims, 7 Drawing Sheets

USER READABILITY IMPROVEMENT FOR DYNAMIC UPDATING OF SEARCH RESULTS

CROSS REFERENCE TO OTHER APPLICATIONS

This application is a continuation of co-pending U.S. patent application Ser. No. 13/467,725, entitled USER READABILITY IMPROVEMENT FOR DYNAMIC UPDATING OF SEARCH RESULTS, filed May 9, 2012, which is a continuation of U.S. patent application Ser. No. 11/522,059, now U.S. Pat. No. 8,201,107, entitled USER READABILITY IMPROVEMENT FOR DYNAMIC UPDATING OF SEARCH RESULTS, filed Sep. 15, 2006, both of which are incorporated herein by reference for all purposes.

BACKGROUND OF THE INVENTION

Search engines determine and display results responsive to a search query. In some cases, a need to update the display of search results arises, e.g., because additional results are received, such as from an additional source, batch, or process. However, it may be disruptive and/or confusing to abruptly replace an existing display of search results with an updated display that integrates additional results, e.g., in rank order relative to the previously-displayed results. A user viewing such a display updated in this manner may not readily be able to determine which results are new, for example, and where they have been inserted into the previous results; may lose track of which (e.g., pre-update) results have already been viewed and/or considered; and/or may have to hunt in the updated display for a result the user was viewing when the display was updated by replacing a display the user was viewing abruptly with a replacement page. It would be beneficial to be able to update displayed search results in a manner that better enables a user to use efficiently both the pre-existing and newly-added results.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Presenting search results is disclosed. One or more results in a displayed set of search results is shown moving to create a space. An additional search result is displayed in the space. In some embodiments, the space is adjacent to a displayed search result.

In some embodiments, the readability and ease of continued and/or continuous use of a display of search results is improved by using animation techniques to update the display dynamically. Animating the updates such that perception by a user is intuitively understandable in some embodiments improves the user's experience. For example, in some embodiments one or more new search results are inserted between two existing entries (between which, e.g., the new entry/entries fall in order of relevance to the query) by showing one or both of the other entries to move to create a blank space between them and then inserting the new result in the space.

Figure 1:
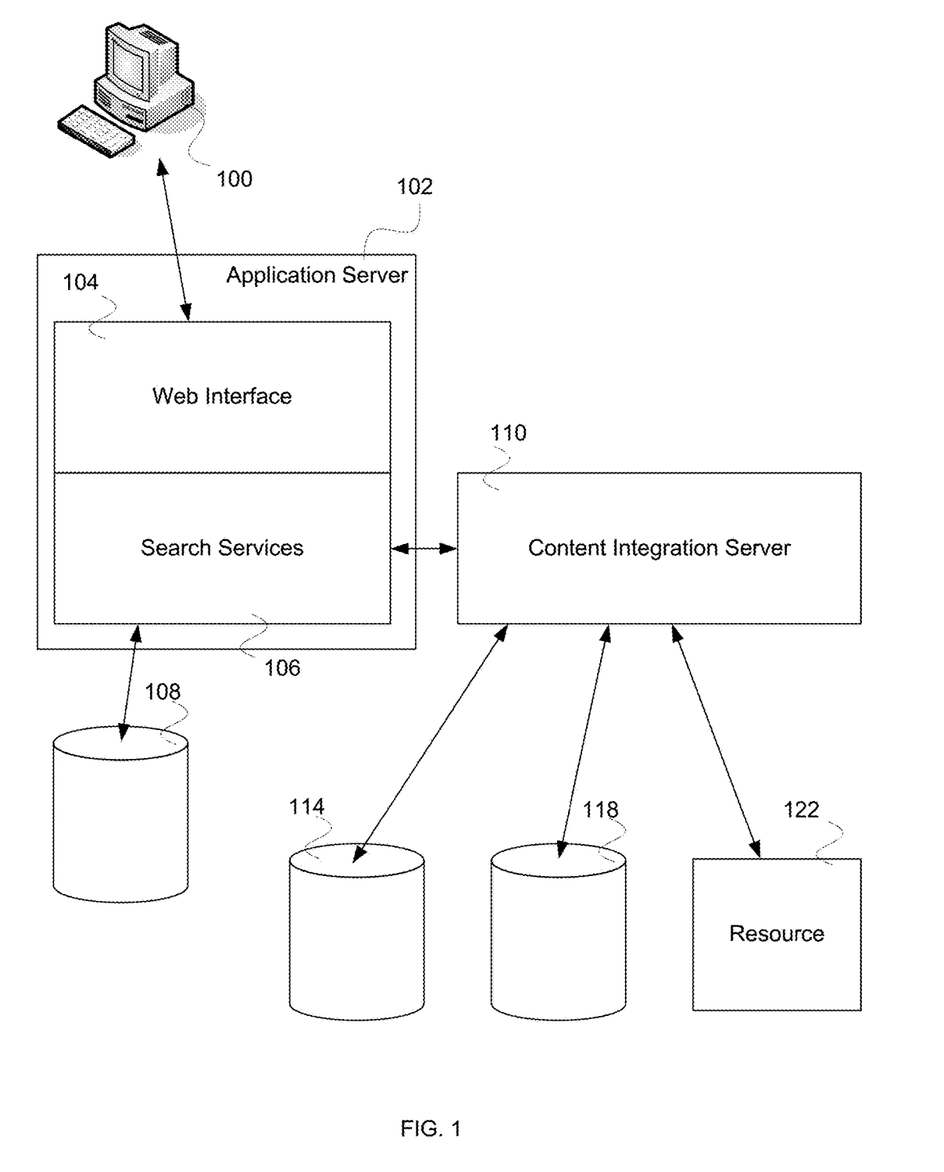
FIG. 1 is a block diagram illustrating an embodiment of a system for providing search results.

FIG. 1 is a block diagram illustrating an embodiment of a system for providing search results. In the example shown, one or more users connect to web-based application server 102 using a computer system, represented in FIG. 1 by computer 100. In the example shown, web-based application server 102 includes web interface 104. Web-based application server 102 in some embodiments provides to users search services that are metadata or type aware. An example of a search service that is metadata or type aware includes providing search results based at least in part on content item type, e.g., sorting relevance based on file type such as picture file, text file, database file, spreadsheet file, computer aided design file, page layout file, drawing file, word processor file, slide presentation file, etc. Web-based application server 102 also includes search services 106. In some embodiments, search services 106 are included in a content management framework comprising foundation classes and associated services configured to provide content management functionality. In some embodiments, the content management functionality includes the ability to perform a federated search of multiple repositories, potentially of dissimilar type. In some embodiments, if search results from two or more repositories at different times, e.g., due to differences in response time, processing required to normalize and/or integrate results, etc., results from a first repository may be presented and/or integrated into a display of results, e.g., in relevance rank order, before results from a second repository have been received and/or are ready to be integrated and/or displayed. When subsequently received and/or ready for integration and/or display, in some embodiments results from the second repository are integrated dynamically into the search results display, automatically and without requiring any refresh or other input from a user, e.g., by adding at least a subset of results from the second repository to previously received and processed results to create a combined set of results, sorting the combined set, for example by relevance to the search query, and updating the display to present at least a subset (e.g., the most relevant) of the results in the combined set.

In some embodiments, web-based application server 102 comprises a content management system, and a user submits a search query to the content management system. The content management application and/or a service associated therewith in some embodiments searches both one or more internal repositories associated with the application server and one or more external repositories and other attached resources. In some embodiments, the search query is received via a web interface such as interface 104, which invokes search services 106 to perform the search. Search services 106 performs a direct search of internal repository 108 and an indirect search of external repositories/resources via content integration server 110. Content integration server 110 targets the search request for a search of one or more external repositories, represented in FIG. 1 by 114 and 118, and/or other resources, represented in FIG. 1 by 122. In various embodiments, external repositories comprise content management systems, database systems, legacy content management systems not capable of the type of search desired, (e.g., Filenet™, LexisNexis™, Lotus Notes™, etc.). In various embodiments, other resources include information sources or search services—for example, Google™, Yahoo™, MSN™, My Simon™, Pricewatch™, Ask™, etc. In some embodiments, the targeted search request is translated and adapted using a configuration adapter, not shown in FIG. 1. The configuration adapter also translates and adapts the responses to the search request and passes the responses to content integration server 110. In some embodiments, the configuration adapter includes associated information in the response to the search request. In some embodiments, the associated information is ultimately used as metadata information that enables the content management system to treat the search results as typed information for the results of the search.

Figure 2:
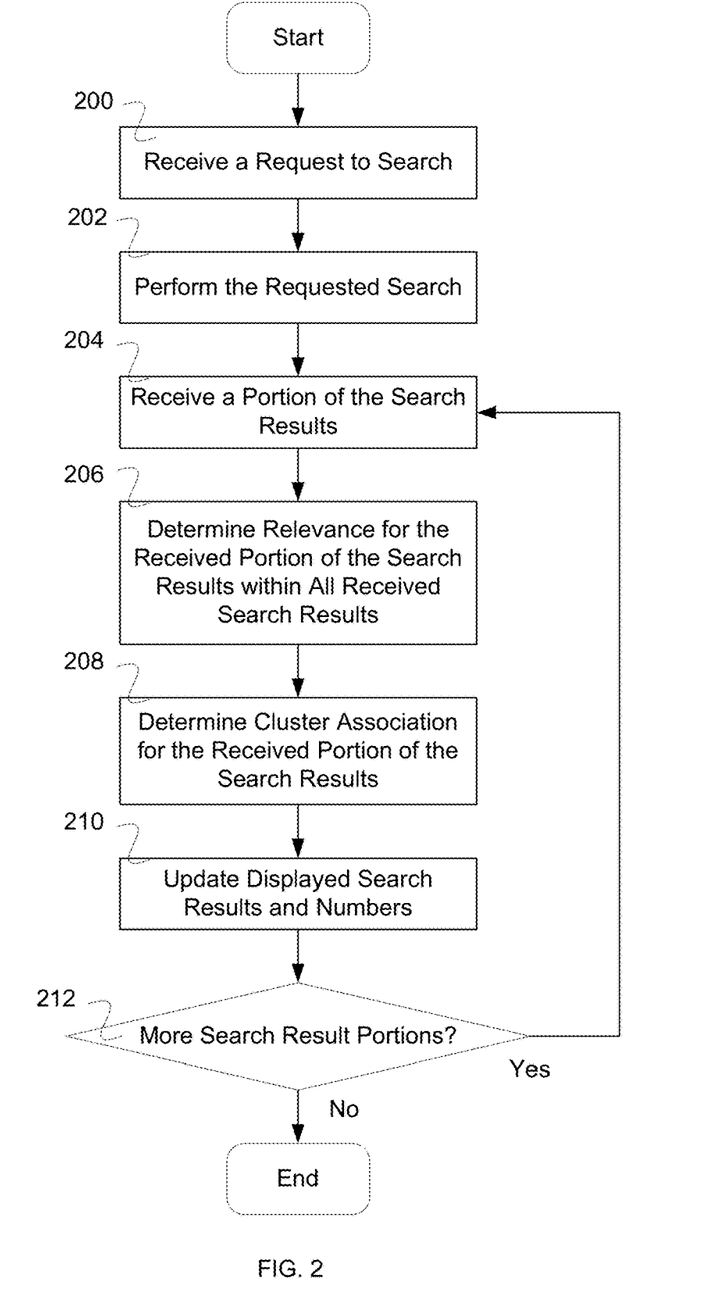
FIG. 2 is a flow diagram illustrating an embodiment of a process for presenting search results.

FIG. 2 is a flow diagram illustrating an embodiment of a process for presenting search results. In some embodiments, the process of FIG. 2 is executed on a web-based application server such as web-based application server 102 of FIG. 1. In the example shown, in 200 a search request is received. In 202, the search is performed. In 204, a portion of the results of the search are received. In 206, relevance is determined for the received portion of the search results. In some embodiments, if other results were received previously, 206 includes determining the relevance of the new results relative to all received search results, e.g., by receiving or determining a normalized or common measure of relevance (e.g., a score or other measure) and sorting the combined results by relevance. In various embodiments, relevance is calculated using web page ranking algorithms including hypertext induced topic selection (HITS) algorithm, PageRank™, TrustRank™, or any other appropriate algorithm. In some embodiments, relevance is calculated based at least in part on one or more of the following: file elements, title words, keywords, text topic areas, related term use, metadata, citation or reference links, document organization and hierarchy, headings, age of file, size of file, type of file, grammar use, spelling accuracy, stop word frequency, reading level, duplicate content, or any other appropriate relevance basis. In some embodiments, the relevance is determined by an entity other than a content management system configured to search multiple repositories, e.g., by the respective repositories themselves and/or an intermediary or other third party, and reported or otherwise provided to the content management system.

In 208, respective associated cluster(s) for the received portion of the search results is/are determined. In some embodiments, an associated cluster includes search results that are determined to be similar for a particular aspect of the search result (e.g., an aspect can be the subject, the file type, the time period, a keyword, the source, the company, the organization, etc.).

In 210, search results and totals are updated in the search results display. In some embodiments, a display of search results is updated such that the ordering of the displayed results is updated. In various embodiments, totals summarizing the search results are updated on the display including one or more of the following: total number of search results, total number of three star rated search results, total number of two star rated search results, total number of one star rated search results, total number of no star rated search results, total number of search results associated with a given cluster, or any other any other appropriate total of the search result display.

In 212, it is determined if there are more search result portions. If there are more search result portions, then control passes to 204. If there are not more search result portions, then the process ends.

Figure 3:
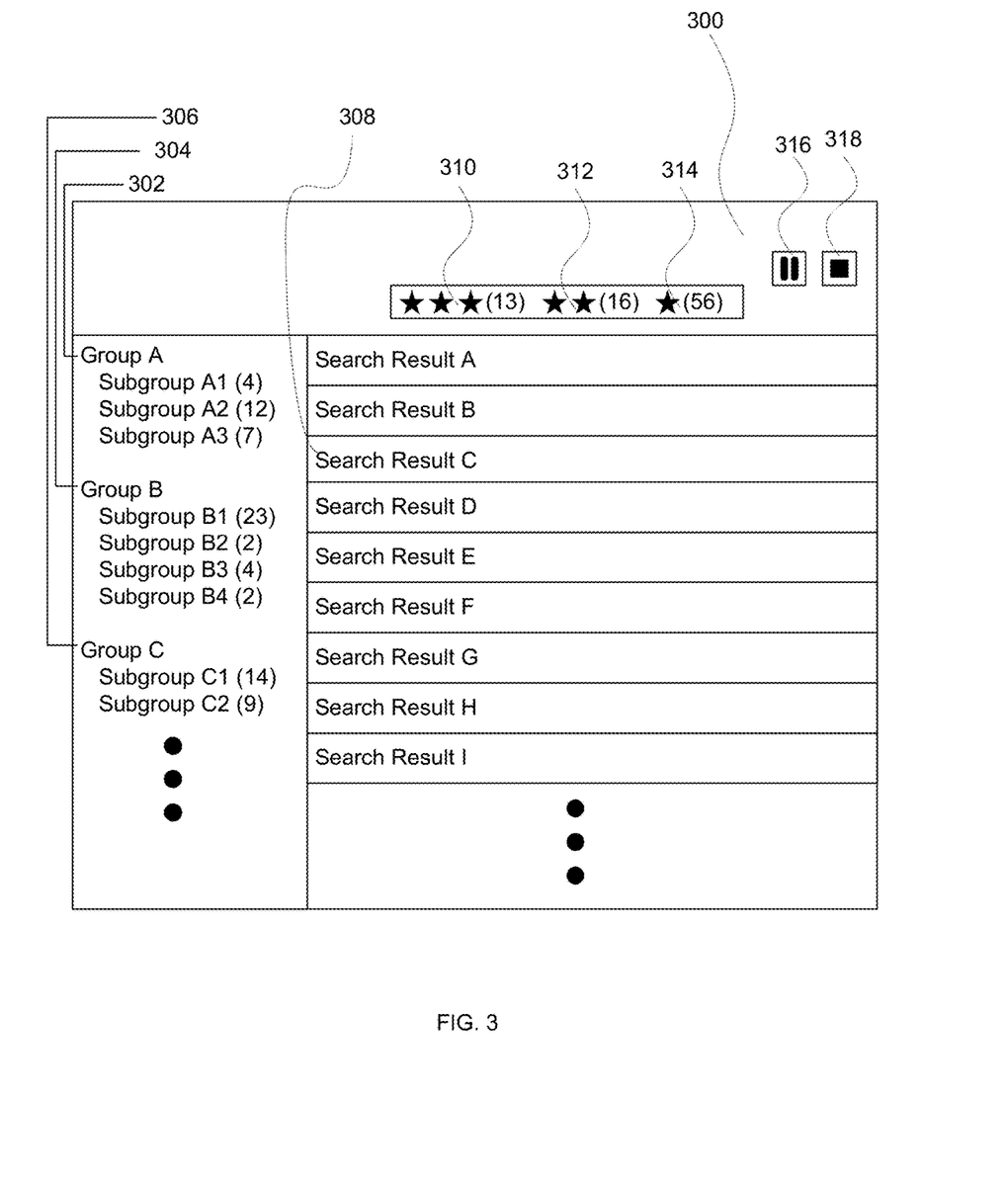
FIG. 3 is a block diagram illustrating a search results window in one embodiment.

FIG. 3 is a block diagram illustrating a search results window in one embodiment. In some embodiments, the results of the process of FIG. 2 are displayed using the window of FIG. 3. In the example shown, search results display window 300 includes cluster results, search results, ranking summary, and control buttons. Cluster results are displayed in a side bar area of the window. A plurality of clusters are displayed, represented in FIG. 3 by group A 302 with subgroups A1, A2, and A3 (with associated number of results 4, 12, and 7, respectively), group B 304 with subgroups B1, B2, B3, and B4 (with associated number of results 23, 2, 4, and 2, respectively), and group C 306 with subgroups C1 and C2 (with associated number of results 14 and 9, respectively). Examples of groups include by source (e.g., repository, organization, author, etc.), subject, keyword, geographic origin, associated geographic designator (e.g., city or other locale mentioned in or otherwise determined to be associated with result), title, etc. Examples of a subgroup include a specific repository, subject, keyword, etc.

Search results are displayed in a main area of the window. A plurality of search results are displayed, represented in the example shown in FIG. 3 by search results A-I, including search result C (308). The ranking summary is displayed in a top area of the window. The ranking summary includes the total number of search results with a given star ranking. In the example shown, 13 search results have a three star ranking 310, 16 results have a two star ranking 312, and 56 results have a one star ranking 314. In some embodiments, a no star ranking and no star associated search results are displayed (not shown in FIG. 3). In various embodiments, one or more of the following are shown in the search results display window (not shown in FIG. 3): a total number of search results, a total number of search results shown on the current window page, a total number of window page results, or any other appropriate statistics or totals relevant to the search results.

Control buttons are displayed in a top area of the window. Pause button 316 enables a user to indicate that a pause of the automatic updating of the display is desired without terminating an on-going search. Stop button 318 enables a user to indicate that a stop of the automatic updating of the display and a stop of the on-going search are desired. The stop can be useful in the event that the search is taking to long, sufficient results have been located, or the search is hanging waiting for initial or additional results.

Figure 4:
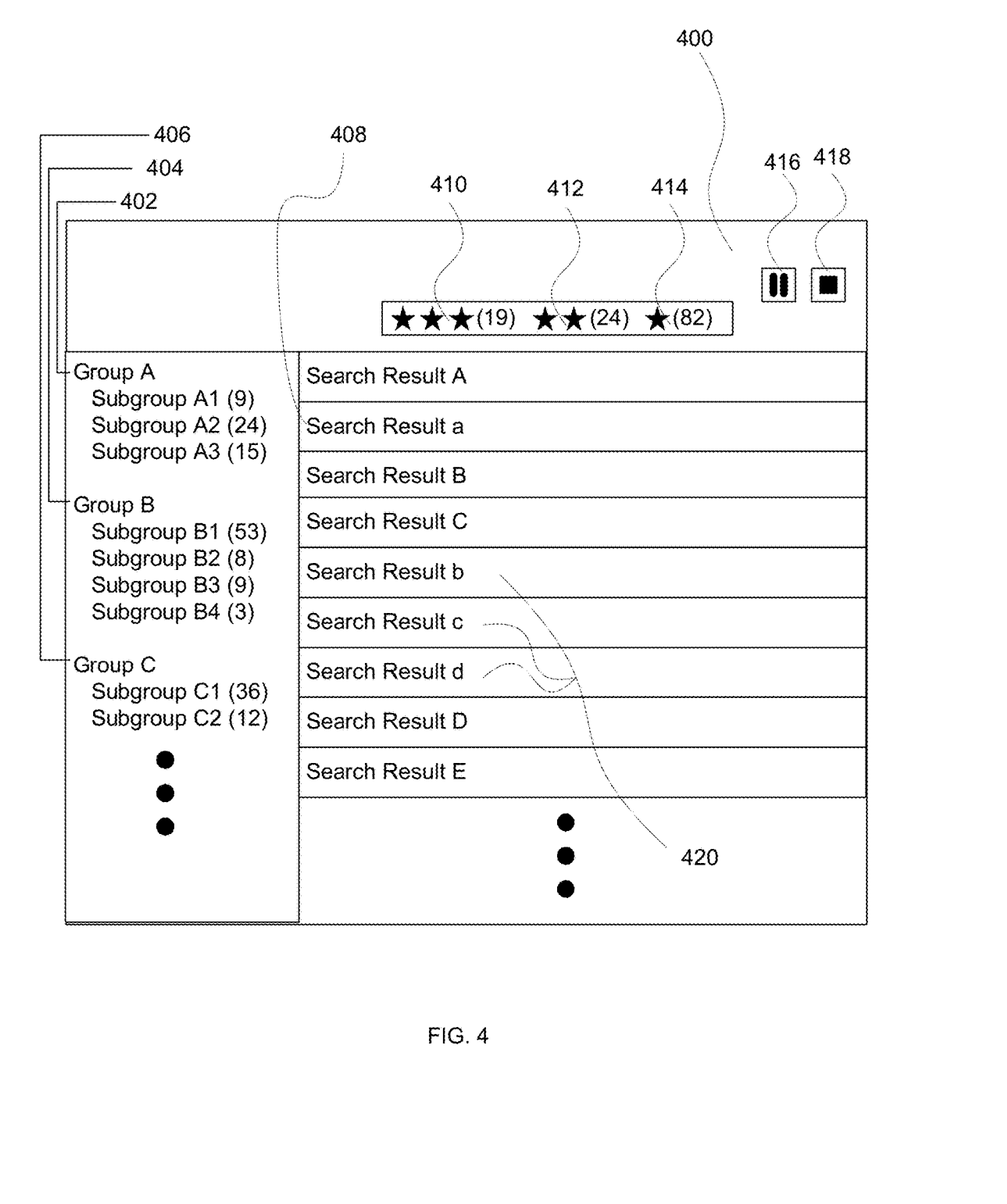
FIG. 4 is a block diagram illustrating an updated search results window in one embodiment. In some embodiments, the updated results of the process of FIG. 2 are displayed using the window of FIG. 4.

FIG. 4 is a block diagram illustrating an updated search results window in one embodiment. In some embodiments, the updated results of the process of FIG. 2 are displayed using the window of FIG. 4. In the example shown, updated search results display window 400 includes updated cluster results, updated search results, an updated ranking summary, and control buttons. Updated cluster results are displayed in a side bar area of the window. A plurality of updated clusters are displayed, represented in FIG. 4 by group A 402 with subgroups A1, A2, and A3 (with updated associated number of results of 9, 24, and 15, respectively), group B 404 with subgroups B1, B2, B3, and B4 (with updated associated number of results of 53, 8, 9, and 3, respectively), and group C 406 with subgroups C1 and C2 (with updated associated number of results of 36 and 12, respectively). In some embodiments, additional (i.e., new) clusters (groups or subgroups) determined to be required and/or appropriate based on the newly received results that caused the display of search results to be updated automatically may be presented (not shown in FIG. 4).

Updated search results are displayed in a main area of the window. In the example shown, new results 408 and 420 have been inserted into the search results display. In some embodiments, there may be some search results from the original display of results that do not appear on the updated search results window (e.g., previously displayed search result F, G, H, and I of FIG. 3 are not displayed), for example to make room for more relevant results the receipt and/or processing of which caused the display to be updated. In some embodiments, the order of the displayed search results is updated, e.g., if subsequently received results are determined to be more relevant than at least some previously displayed results. The updated search results are represented in FIG. 4 by search results A, a, B, C, b, c, d, D, and E. In this example results a (408) and b-d (420) have been integrated in their rank order within the combine set of results (original plus subsequently received/processed). The updated ranking summary is displayed in a top area of the window. The updated ranking summary (410-414) includes for each respective star ranking an updated total number of search results. In some embodiments, a no star ranking and updated no star associated search results are displayed (not shown in FIG. 4). In various embodiments, one or more of the following are shown in the updated search results display window (not shown in FIG. 4): an updated total number of search results, an updated total number of search results shown on the current window page, an updated total number of window page results, or any other appropriate statistics or totals relevant to the updated search results.

Control buttons 416 and 418 are displayed in a top area of the window. Pause button 416 operates similar to pause button 316 of FIG. 3. Stop button 418 operates similar to stop button 318 of FIG. 3. In some embodiments, if "pause" button 416 is pressed, the button reads "play". Clicking on play later, will update the screen to the latest status of the search. While pause stops the update of the screen, the search is still progressing in the background—some sources are returning additional results. When the search is over, the pause button is no longer visible.

Figure 5:
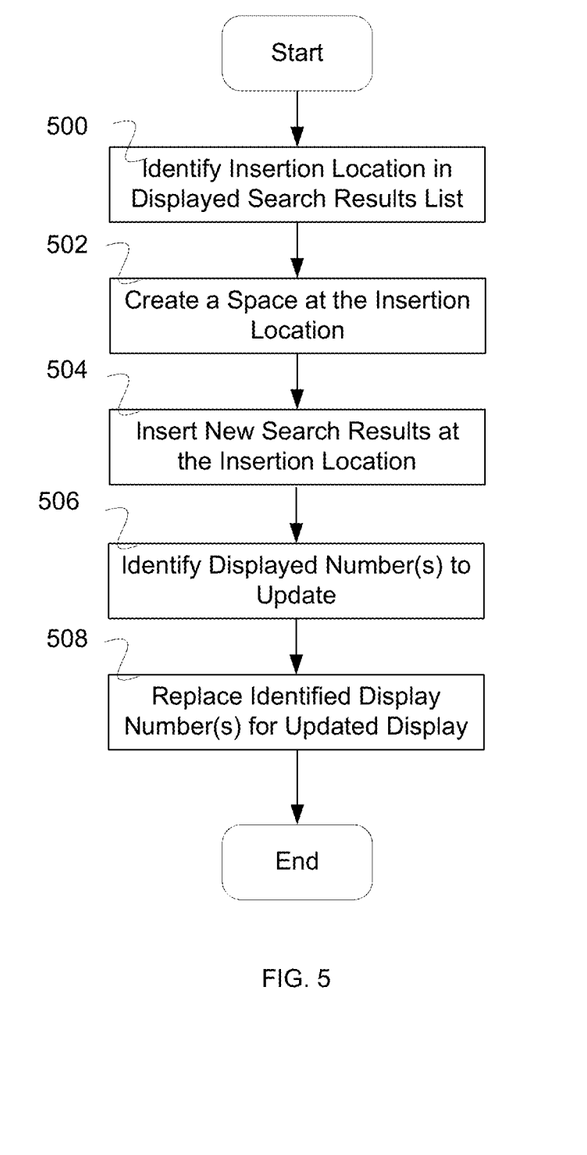
FIG. 5 is a flow diagram illustrating an embodiment of a process for updating displayed search results and associated data, such as statistics, cluster/grouping results, etc.

FIG. 5 is a flow diagram illustrating an embodiment of a process for updating displayed search results and associated data, such as statistics, cluster/grouping results, etc. In some embodiments, the process of FIG. 5 is used to implement 210 of FIG. 2. In the example shown, in 500 the insertion location is identified in the displayed search results list. In some embodiments, the insertion location is a location that depends on a displayed set of search results and a set of updated search results. In those locations where there is a difference between the set of updated search and the displayed set of search results, there is a different search result that needs to be displayed. In some embodiments, the need to insert an updated search result may arise in the context of a federated search of multiple repositories and/or other content sources. A first source may return results faster than a second, with the consequence that one or more results from the second source may need to be inserted in appropriate places in the display of search results, for example if such one or more results from the second source were more relevant to the search query than one or more results in a set of results from the first source included in the search results as displayed prior to receipt and integration of the results from the second source. In some embodiments, the approach described herein enables results to be displayed quickly and consistently (i.e., all sorted on the same criteria) Other systems typically would either wait for all sources to come back—hence the speed of the system is driven by the slowest source—or display results as they arrive—i.e., not as an integrated set sorted based on the sort criteria.

In 502, a space is created at the insertion location. In some embodiments, the blank space is shown to open relatively slowly, e.g., at a rate such that a user can perceive more readily the change in the displayed search results. In some embodiments, the blank space is created by animating the creation of a blank space that appears to push apart the adjacent search result entries, or to push one away from another that remains stationary, to create a space to insert the updated search results. In some embodiments, the insertion location depends on the ordering of a second set of search results as merged into a first set of ordered search results. In various embodiments, the ordering of the search results depends on a relevance ranking of the search results within a first set of search results and within a combined first and second set of search results.

In 504, the new search results are inserted at the insertion location. In some embodiments, the new search results are members of a second set of search results that are being combined with a first set of already displayed search results. In 506, displayed numbers (e.g., statistics, clusters/groups, etc.) to update are identified. In various embodiments, the displayed numbers to update comprise a total number of search results, a total number of search results in a display window, a number of search results for each of one or more relevance levels (e.g., a star ranking such as a three, two, one, or no star ranking), a number of search results associated with a cluster, or any other appropriate number. In 508, the identified display numbers are replaced for the updated display.

Figure 6:
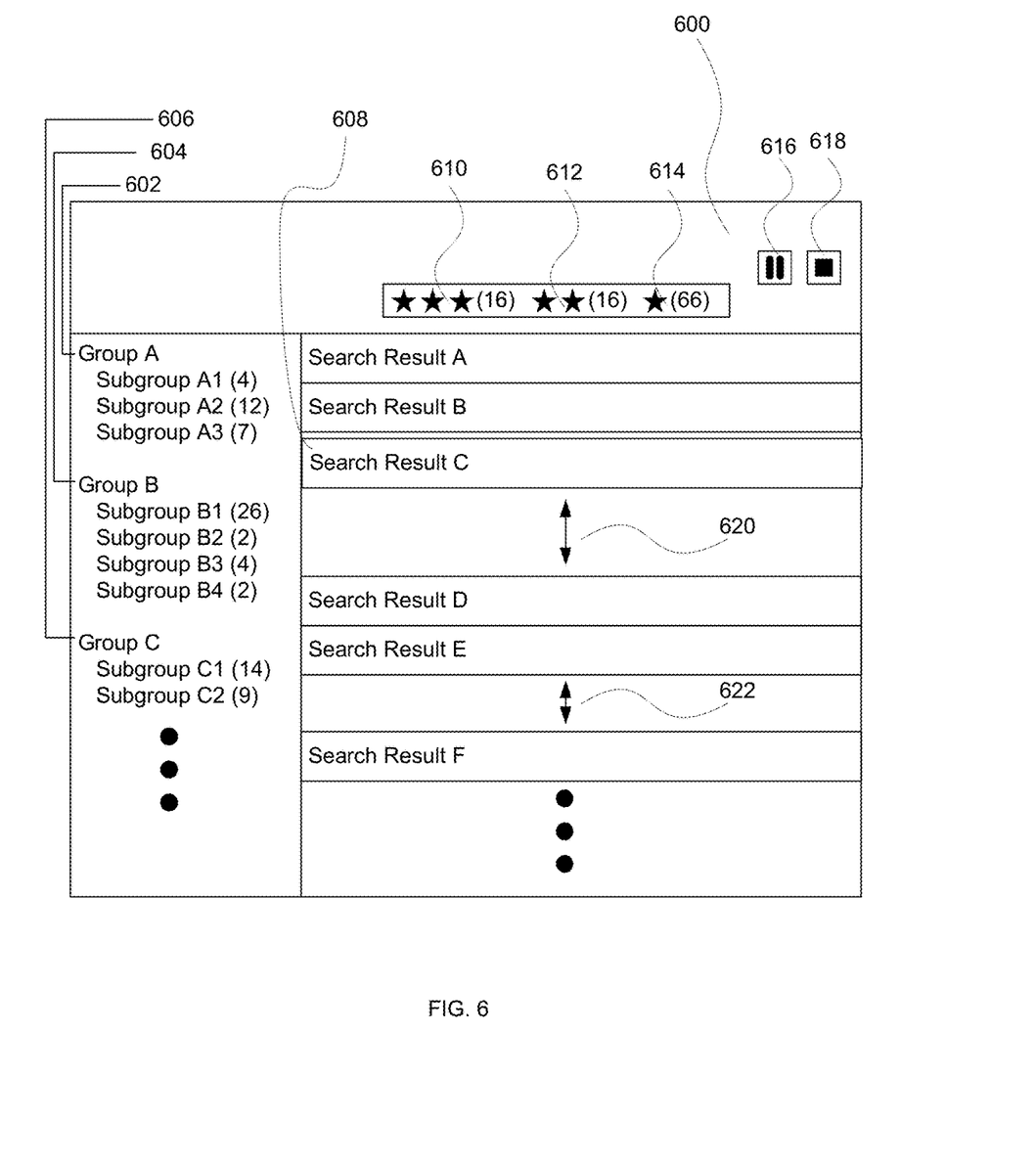
FIG. 6 is a block diagram illustrating a search results window during updating in one embodiment.

FIG. 6 is a block diagram illustrating a search results window during updating in one embodiment. In some embodiments, the updated results of the process of FIG. 2 are displayed using the window of FIG. 6. In the example shown, updated search results display window 600 includes cluster results, search results, a ranking summary, and control buttons. Cluster results are displayed in a side bar area of the window. A plurality of clusters are displayed, represented in FIG. 6 by group A 602 with subgroups A1, A2, and A3 (with associated number of results of 4, 12, and 7, respectively), group B 604 with subgroups B1, B2, B3, and B4 (with associated number of results of 26, 2, 4, and 2, respectively), and group C 606 with subgroups C1 and C2 (with associated number of results of 14 and 9, respectively).

In the example shown, updated search results are to be displayed in a main area of the window at insertion locations 620 and 622. In some embodiments, there are some search results that do not appear on the updated search results window (e.g., previously displayed search result F, G, H, and I of FIG. 3 are not displayed, in this example because search results more relevant to the query that F, G, H, and I of FIG. 3 have been received and need to be displayed in the limited display area available). In some embodiments, the order of the displayed search results is updated and a space is grown within the display in a place where the updated search results are to be inserted. In some embodiments the space is grown so that the user is aware that the display is being updated and is able to understand better the change in the search result display, such as by realizing more readily which results are being and/or have been added and where such results are being and/or have been added relatively to previously-displayed results. In some embodiments, the space is grown in a fashion perceived to by the human eye to be continuous or nearly so. In some embodiments, the space is grown by displaying an animated sequence in which the space is larger in successive frames of the animated sequence.

The ranking summary is displayed in a top area of the window. In the example shown, the ranking summary includes for each star ranking (610-614) an updated total number of search results having that ranking. In some embodiments, a no star ranking and updated no star associated search results are displayed (not shown in FIG. 6). In various embodiments, one or more of the following are shown in the search results display window (not shown in FIG. 6): a total number of search results, a total number of search results shown on the current window page, a total number of window page results, or any other appropriate statistics or totals relevant to the search results.

Control buttons 616 and 618 are displayed in a top area of the window. Pause button 616 operates similar to pause button 316 of FIG. 3. Stop button 618 operates similar to stop button 318 of FIG. 3.

Figure 7:
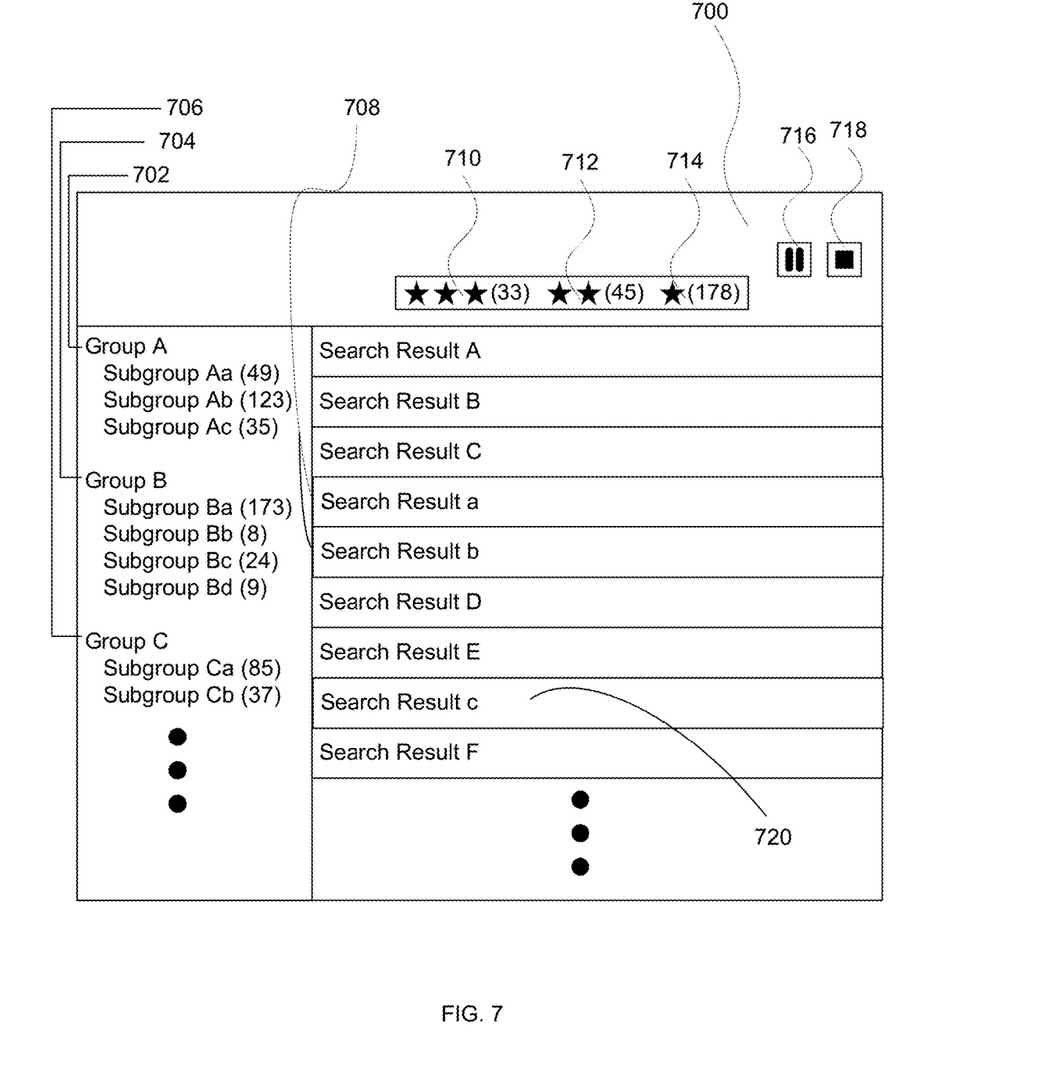
FIG. 7 is a block diagram illustrating an updated search results window in one embodiment.

FIG. 7 is a block diagram illustrating an updated search results window in one embodiment. In some embodiments, the updated results of the process of FIG. 2 are displayed using the window of FIG. 7. In the example shown, updated search results display window 700 includes updated cluster results, updated search results, an updated ranking summary, and control buttons. Updated cluster results are displayed in a side bar area of the window. A plurality of updated clusters are displayed, represented in FIG. 7 by group A 702 with subgroups A1, A2, and A3 (with updated associated number of results of 49, 123, and 35, respectively), group B 704 with subgroups B1, B2, B3, and B4 (with updated associated number of results of 173, 8, 24, and 9, respectively), and group C 706 with subgroups C1 and C2 (with updated associated number of results of 85 and 37, respectively).

In the example shown, new results 708 and 720 have been inserted into the search results display. In some embodiments, there are some search results that do not appear on the updated search results window (e.g., previously displayed search result G, H, and I of FIG. 3 are not displayed). In some embodiments, the order of the displayed search results is updated. The updated search results are represented in FIG. 7 by search results A, B, C, a, b, D, E, c, and F. The updated ranking summary is displayed in a top area of the window. The updated ranking summary includes for each star ranking (710-714) an updated total number of search results having that star ranking. In some embodiments, a no star ranking and updated no star associated search results are displayed (not shown in FIG. 7). In various embodiments, one or more of the following are shown in the updated search results display window (not shown in FIG. 7): an updated total number of search results, an updated total number of search results shown on the current window page, an updated total number of window page results, or any other appropriate statistics or totals relevant to the updated search results.

Control buttons 716 and 718 are displayed in a top area of the window. Pause button 716 operates similar to pause button 316 of FIG. 3. Stop button 718 operates similar to stop button 318 of FIG. 3.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for moving search results visibly comprising:
an interface; and
a processor coupled to the interface and configured to:
 perform a search based on a search query inputted into the interface, wherein the search returns a first set of search results from a first repository and a subsequent set of search results from a second repository;
 cause a display of a set of search results of the search, the set of search results comprising the first set of search results before the subsequent set of search results is returned from the second repository; and
 in response to the subsequent set of search results of the search being returned:
  animate the creation of one or more blank spaces for one or more search results of the subsequent set of search results of the search by moving one or more search results of the first set of search results of the search, wherein the one or more blank spaces are grown by displaying an animated sequence in which the one or more blank spaces are larger in successive frames of the animated sequence, wherein the one or more search results of the first set of search results are shown in the animated sequence to move at a rate selected to enable a user to perceive the subsequent search results being added to the set of search results, wherein at least one blank space is grown in between two search results of the first set of search results; and
  cause a display of one or more results of the subsequent set of search results of the search in the one or more blank spaces, wherein at least one of the subsequent set of search results of the search is displayed in the at least one blank space.

2. The system of claim 1, wherein the one or more blank spaces are created within the displayed set of search results.

3. The system of claim 1, wherein the one or more blank spaces are created adjacent to one or more of the one or more results.

4. The system of claim 1, wherein the one or more blank spaces are created in a continuous fashion.

5. The system of claim 1, wherein the processor is further configured to identify one or more insertion locations for the one or more blank spaces.

6. The system of claim 5, wherein the one or more insertion locations are based at least in part on an ordering of the subsequent set of search results as merged into the first set of search results.

7. The system of claim 6, wherein the ordering of a search result included in the subsequent set of search results depends on a relevance ranking of the subsequent set of search results within a combination of the first set of search results and the subsequent set of search results.

8. The system of claim 1, wherein to animate the creation of one or more blank spaces for one or more search results of the subsequent set of search results includes pushing apart the adjacent search result entries.

9. The system of claim 1, wherein to animate the creation of one or more blank spaces for one or more search results of the subsequent set of search results includes pushing one of the search results while another search result remains stationary.

10. A method for moving search results visibly, comprising:
performing a search based on a search query inputted into the interface, wherein the search returns a first set of search results from a first repository and a subsequent set of search results from a second repository;
causing a display of a set of search results of the search, the set of search results comprising the first set of search results before the subsequent set of search results is returned from the second repository; and
in response to the subsequent set of search results of the search being returned:
animating the creation of one or more blank spaces for one or more search results of the subsequent set of search results of the search by moving one or more search results of the first set of search results of the search, wherein the one or more blank spaces are grown by displaying an animated sequence in which the one or more blank spaces are larger in successive frames of the animated sequence, wherein the one or more search results of the first set of search results are shown in the animated sequence to move at a rate selected to enable a user to perceive the subsequent search results being added to the set of search results, wherein at least one blank space is grown in between two search results of the first set of search results; and
causing a display of one or more results of the subsequent set of search results of the search in the one or more blank spaces, wherein at least one of the subsequent set of search results of the search is displayed in the at least one blank space.

11. The method of claim 10, wherein the one or more blank spaces are created within the displayed set of search results.

12. The method of claim 10, wherein the one or more blank spaces are created adjacent to one or more of the one or more results.

13. The method of claim 10, further comprising identifying one or more insertion locations for the one or more blank spaces.

14. The method of claim 13, wherein the one or more insertion locations are based at least in part on an ordering of the subsequent set of search results as merged into the first set of search results.

15. The method of claim 14, wherein the ordering of a search result included in the subsequent set of search results depends on a relevance ranking of the subsequent set of search results a combination of the first set of search results and the subsequent set of search results.

16. The method of claim 10, wherein animating the creation of one or more blank spaces for one or more search results of the subsequent set of search results includes pushing apart the adjacent search result entries.

17. The method of claim 10, wherein animating the creation of one or more blank spaces for one or more search results of the subsequent set of search results includes pushing one of the search results while another search result remains stationary.

18. A non-transitory computer readable medium comprising computer instructions for:
performing a search based on a search query inputted into the interface, wherein the search returns a first set of search results from a first repository and a subsequent set of search results from a second repository;
causing a display of a set of search results of the search, the set of search results comprising the first set of search results before the subsequent set of search results is returned from the second repository; and
in response to the subsequent set of search results of the search being returned:
animating the creation of one or more blank spaces for one or more search results of the subsequent set of search results of the search by moving one or more search results of the first set of search results of the search, wherein the one or more blank spaces are grown by displaying an animated sequence in which the one or more blank spaces are larger in successive frames of the animated sequence, wherein the one or more search results of the first set of search results are shown in the animated sequence to move at a rate selected to enable a user to perceive the subsequent search results being added to the set of search results, wherein at least one blank space is grown in between two search results of the first set of search results; and
causing a display of one or more results of the subsequent set of search results of the search in the one or more blank spaces, wherein at least one of the subsequent set of search results of the search is displayed in the at least one blank space.

19. The computer readable medium of claim 18, wherein animating the creation of one or more blank spaces for one or more search results of the subsequent set of search results includes pushing apart the adjacent search result entries.

20. The computer readable medium of claim 18, wherein animating the creation of one or more blank spaces for one or more search results of the subsequent set of search results includes pushing one of the search results while another search result remains stationary.

* * * * *